UNITED STATES PATENT OFFICE.

HARRY C. RENINGER, OF WILLIAMSPORT, PENNSYLVANIA.

COUGH-REMEDY.

SPECIFICATION forming part of Letters Patent No. 248,350, dated October 18, 1881.

Application filed December 31, 1880. (No specimens.)

*To all whom it may concern:*

Be it known that I, HARRY C. RENINGER, of Williamsport, in the county of Lycoming and State of Pennsylvania, have invented certain new and useful Improvements in Remedies for Coughs and Consumption, of which the following is a specification.

Take six ounces blacksnake-root, six ounces elecampane-root, six ounces comfrey-root, six ounces spikenard-root, four ounces hoarhound, (tops,) six ounces wild-cherry bark, two ounces calumba-root, four ounces dandelion-root, four ounces prince's-pine leaves, four ounces elder-blossoms, four ounces boneset, (tops,) one ounce extract chestnut-leaves, seven pounds sugar, and two gallons soft water. Boil slowly and steadily until the above quantity is reduced to one gallon.

The said composition of matter is to be used for coughs and consumption by taking internally, as follows: for an adult, one tea-spoonful three times a day; for a child, a quantity bearing the same ratio to a tea-spoonful that the size of the child bears to that of an adult—in all cases to be taken after eating.

I am aware that the ingredients assembled by me in the said composition are, in various combinations, in common use as remedies for coughs and consumption; but I am not aware that all of the ingredients of my composition, in the proportions stated, have been used together.

What I claim, and desire to secure by Letters Patent of the United States, is—

The composition of matter described, to be used as a remedy for coughs and consumption, consisting of blacksnake-root, elecampane-root, comfrey-root, spikenard-root, hoarhound-tops, wild-cherry bark, calumba-root, dandelion-root, prince's-pine leaves, elder-blossoms, boneset-tops, extract chestnut-leaves, sugar, and soft water, in the proportions therein specified.

In testimony that I claim the foregoing as my own I affix my signature, in presence of two witnesses, December 28, 1880.

HARRY C. RENINGER.

Witnesses:
SAMUEL McKEAN,
J. J. BELL.